United States Patent [19]

Pfiffner

[11] 3,740,581

[45] June 19, 1973

[54] PRECISION SWITCHING CIRCUIT FOR ANALOG SIGNALS

[75] Inventor: Harold J. Pfiffner, Los Angeles, Calif.

[73] Assignee: Hughes Aircraft Company, Culver City, Calif.

[22] Filed: Mar. 8, 1972

[21] Appl. No.: 233,083

[52] U.S. Cl. .................... 307/251

[51] Int. Cl. .................... H03k 17/60

[58] Field of Search .................... 307/205, 251, 279, 307/221 C, 304

[56] References Cited

UNITED STATES PATENTS

| | | | |
|---|---|---|---|
| 3,588,525 | 6/1971 | Hatsukano | 307/251 |
| 3,401,359 | 9/1968 | Becker | 307/251 |
| 3,643,111 | 2/1972 | Devo | 307/251 |
| 3,634,825 | 1/1972 | Levi | 307/251 |
| 3,633,050 | 1/1972 | Zajac | 307/251 |
| 3,631,528 | 12/1971 | Green | 307/251 |
| 3,596,109 | 7/1971 | Marshall | 307/251 |

*Primary Examiner*—John W. Huckert
*Assistant Examiner*—R. E. Hart
*Attorney*—W. H. MacAllister, Jr. and John M. May

[57] ABSTRACT

A precision high-speed, low impedance switching circuit is disclosed which is suitable for use with video or other high frequency analog signals. A J-FET is used as the switching element but is controlled by means of a novel circuit which minimizes channel impedance modulation effects. The gate of the J-FET is connected to the output of a control transistor, the input of the control transistor being connected to the input signal, thereby allowing the effective parasitic input capacity at the gate of the J-FET switch to be charged and discharged in accordance with the fluctuations of the input signal.

5 Claims, 3 Drawing Figures

PRECISION SWITCHING CIRCUIT FOR ANALOG SIGNALS

FIELD OF THE INVENTION

This invention pertains to electronic circuits, and more particularly to a transistorized circuit for precision high speed, low impedance switching of high frequency analog signals.

DESCRIPTION OF THE PRIOR ART

Switching of video and other high frequency analog signals has been previously performed with circuits using either diode ring switches or semiconductor switches of the bipolar J-FET or MOS-FET types. However, prior art switching circuits were generally unsuitable in applications requiring high speed, low impedance precision switching of signals in the 10 to 100 megacycle range.

A diode ring switch has the disadvantage of generating excessive offset voltage errors when used to drive low impedance load and of requiring complicated drive control circuitry. Prior art switching circuits using bipolar semiconductors as the switching element had the disadvantage of requiring a choice between high offset voltage errors or inadequate switching speeds. The high "on" resistance associated with a MOS-FET device used as the switching element requires buffer amplifiers to drive loads of low impedance.

As is well known, when a J-FET device is in its conducting state, the resistance between its source and drain electrodes is very low (typically 2 to 5 ohms) and it is this low "on" resistance which makes the J-FET type of device particularly suitable for driving low impedance circuits. (By way of comparison, a MOS-FET type of device has a source-to-drain resistance in the order of 200 ohms when the device is conductive.) However, prior art circuits employing a J-FET device as the switching element were unsuitable at high frequencies because of excessive channel impedance modulation effects inherent in those prior art circuits, due to signal rectification in the gate circuit of the J-FET device when the switch is "on." This problem is discussed in greater detail on page 78 of "Electronic Analog/Digital Conversions" by Hermann Schmid, Van Nostrand Reinhold, 1970.

SUMMARY OF THE INVENTION

Consequently, one object of the present invention is to provide a switching circuit that combines a high switching speed with the capability of directly driving low impedance loads.

Another object of the present invention is to provide A J-FET switching circuit that minimizes channel impedance modulation effects on video and other high frequency analog signals.

A further object of the invention is to provide a precision high speed, low impedance switching circuit suitable for commutating video or other analog channels onto a common transmission line.

The invention which satisfies these objectives utilizes a J-FET device as the switching element but controls the J-FET device by means of a novel circuit which minimizes the channel impedance modulation effects inherent in prior art circuits. This is achieved by supplementing the J-FET primary switching element with a secondary control transistor which charges the J-FET's gate capacitance to a voltage equal to that of the input signal, so that the input signal is connected to the J-FET gate through the low saturation resistance of the control transistor. This allows the effective parasitic input capacity at the gate of the J-FET basic switch to be charged and discharged in accordance with the fluctuations of the input signal, thereby avoiding signal rectification in the gate circuit.

Additional objects, advantages and characteristic features of the invention will become more apparent from the following detailed description of preferred embodiments of the invention when considered in conjunction with the accompanying drawings.

BRIEF DESCRIPTION OF THE DRAWINGS

In the drawings, wherein like reference characters refer to like parts.

DETAILED DESCRIPTION OF THE FIRST EMBODIMENT

Figure 1:
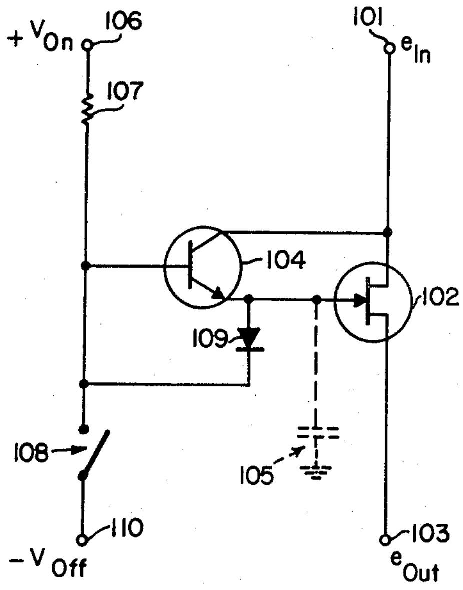
FIG. 1 is a schematic circuit diagram illustrating a switching circuit according to one embodiment of the invention, and employing a J-FET switching device and a bipolar control transistor.

Referring with greater particularity to FIG. 1, it may be seen that a video or other analog input voltage $e_{in}$ applied to input terminal 101 is selectively passed through the drain-source path of an n-channel J-FET (*Junction Field Effect Transistor*) 102 as the J-FET 102 is switched "on" and "off," the resulting signal appearing as output voltage $e_{out}$ at output terminal 103. J-FET 102 preferably is of a low "on" resistance type such as Siliconics No. FN2252, which has a pinch-off voltage of 7.7 volts. The gate electrode of J-FET 102 is connected to the emitter electrode of a bipolar n-p-n type control transistor 104, the collector electrode of transistor 104 being connected to input terminal 101. Bipolar transistor preferably is a small geometry device having a fast switching speed and a suitable voltage rating. It may be of the type commonly designated as 2N 2369A for the particular application discussed below. Capacitor 105 (shown in dashed lines) represents the parasitic gate capacitance of J-FET 102.

The base electrode of control transistor 104 is connected via a current limiting resistor 107 to a power supply terminal 106 providing a DC voltage $+V_{on}$ (more positive than the algebraic maximum value of $e_{in}$ plus the absolute value of the work function of the bipolar junction of transistor 104).

Switch 108 is connected between the base electrode of transistor 104 and a power supply terminal 110 providing a DC voltage $-V_{off}$ (more negative than the algebraic minimum value of $e_{in}$ minus the absolute value of the pinch-off voltage associated with J-FET 102). Although the symbol for a mechanical switch is depicted for the sake of clarity, switch 108 may in actuality be any circuit or device which has the property of low impedance when "closed" and high impedance when "open."

A diode 109 is connected between the gate electrode of J-FET 102 and the base electrode of transistor 104. As it will become more clear hereinafter, diode 109 provides a unidirectional low impedance path to facilitate the rapid turning "off" of J-FET 102 when switch 108 is closed. It may be of the type commonly designated as IN3600.

OPERATION OF THE FIRST EMBODIMENT

When control switch 108 is open, the circuit is in its steady-state "on" condition wherein transistor 104 is conductive to saturation and operating in its inverse mode. At this time the input voltage $e_{in}$ is effectively applied directly to the gate electrode of J-FET 102, since the saturation resistance of bipolar transistor 104 is very low. The effective parasitic input capacitance 105 of J-FET 102 is thus charged and discharged in accordance with dynamic changes in the input voltage $e_{in}$, thereby minimizing signal rectification in the gate circuit and consequent fluctuations in the "on" resistance of the J-FET 102 which would otherwise cause undesirable modulation effects on the output voltage $e_{out}$. It should be noted that a small current will flow through the resistor 107 to the input terminal 101 through the collector-base junction of transistor 104; however, the value of this current is reduced by the transistor's gain factor $\beta$.

The switching circuit is placed in an "off" condition by the closing of control switch 108. The base electrode of bipolar transistor 104 is thus connected to the negative control voltage $V_{off}$ via the terminal 110, and a unidirectional path through diode 109 is provided for discharging parasitic gate capacitance 105 of J-FET 102. Thus it will be seen that control transistor 104 and J-FET switch 102 both are placed in a nonconductive or "off" state, the J-FET in its "off" state acting as a back-biased diode having a typical resistance of 10 megohms.

When the circuit is again turned "on" by opening switch 108, bipolar transistor 104 has a positive voltage applied to its control electrode and operates in an emitter follower mode until the parasitic gate capacitance 105 is charged to a value equal to the input voltage $e_{in}$, the circuit then being in its steady state "on" condition previously described.

Although a circuit using an n-channel J-FET and a n-p-n type bipolar transistor has been described, it will be obvious to those skilled in the art that an equivalent circuit for use with a p-channel J-FET may be obtained by employing a p-n-p type bipolar transistor and reversing the polarity of the diode 109 and the voltages $V_{on}$ and $V_{off}$.

DESCRIPTION OF OTHER EMBODIMENTS

Figure 2:
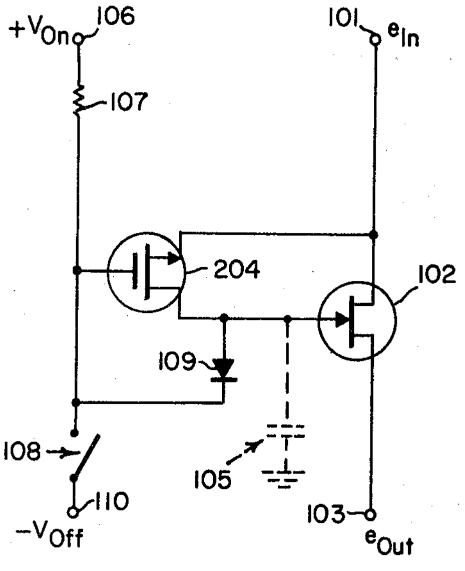
FIG. 2 is a schematic circuit diagram illustrating a second embodiment of the invention wherein the control transistor is a MOS-FET device.

FIG. 2 illustrates a second embodiment wherein the n-p-n bipolar transistor 104 of FIG. 1 is replaced by an n-channel MOS-FET (*Metal Oxide Silicon Field Effect Transistor*) 204 having gate, source and drain electrodes. Because of the inherent dielectric isolation of the MOS-FET insulated gate, complete electrical isolation is afforded between the control voltage $+V_{on}$ and the signal input $e_{in}$.

The operation of the circuit of FIG. 2 is essentially the same as described for FIG. 1, the emitter follower mode of the bipolar transistor 104 corresponding to the source follower mode of the MOS-FET 204. However, on account of the MOS-FET insulated gate, the gate electrode of MOS-FET 204 does not follow the signal input voltage $e_{in}$ but rather remains at $+V_{on}$, and the function of resistor 107 accordingly being not to limit the current flowing from the control voltage source to the signal input, but merely to act as a voltage dividing network between $+V_{on}$ and $-V_{off}$ when control switch 108 is closed; however, some turn-on switching speed is sacrificed as compared to the FIG. 1 embodiment because of the higher "on" resistance of the MOS channel compared to the saturation resistance of a bipolar transistor.

Figure 3:
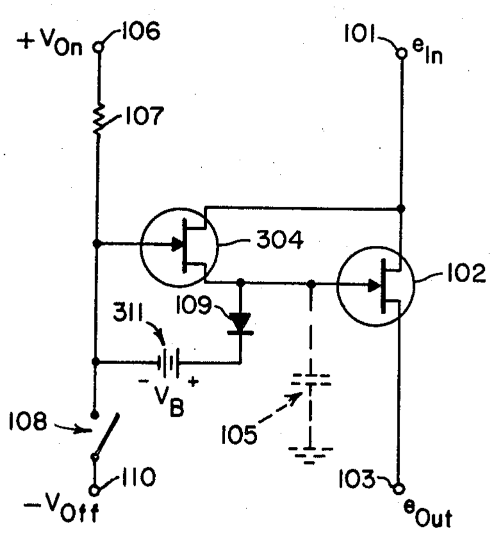
FIG. 3 is a schematic circuit diagram illustrating a third embodiment of the invention wherein the control transistor is a second J-FET device.

FIG. 3 illustrates a third embodiment wherein the n-p-n control transistor 104 of FIG. 1 has been replaced by a second n-channel J-FET 304. The operation of this circuit is also similar to that described for the FIG. 1 embodiment to the source follower mode of J-FET 304 corresponding to the emitter follower mode of transistor 104. The best performance of this embodiment will be obtained when J-FET 102 is a large geometry device in order to minimize its "on" resistance thereby permitting the use of a low impedance load, while J-FET 304 should be a small geometry device thereby reducing its parasitic capacitance and increasing the circuit's switching speed. With this arrangement, it is entirely feasible to fabricate a single IC chip capable of performing as a complete video analog switch. A bias potential ($V_B$) source 311 in series with the diode 109 is included as a means for ensuring that the J-FET 304 is "pinched off" when switch 108 is closed. As was the case for the first two embodiments, an equivalent circuit may be derived by substituting p-channel J-FETs and by reversing the polarities of the diode and of the voltages.

Those skilled in the signal multiplexing and the analog/digital/analog conversion arts will appreciate that the switching circuits disclosed herein are especially useful for commutating a multiple of video signal channels onto a common line, or multiplexing a multiple of DC input signals into a common signal processing unit, or for switching precision of reference voltages (either AC or DC) in an A/D/A converter. Thus, although the present invention has been shown and described with reference to three particular embodiments, nevertheless various changes and modifications obvious to a person skilled in the art of electronic circuits are deemed to lie within the purview of the invention.

What is claimed is:

1. A precision high-speed, low-impedance circuit for switching an analog signal, said circuit comprising:

a J-FET switching element having an input electrode, an output electrode and a gate electrode;

a control transistor having an input electrode connected to said J-FET switching element input electrode, an output electrode connected to said J-FET switching element gate electrode, and a control electrode;

means for providing a unidirectional low impedance path between said J-FET gate electrode and said control transistor control electrode; and switching means for simultaneously applying an "off" control voltage to said control transistor control electrode and via said unidirectional low impedance path to said J-FET gate electrode.

2. The circuit of claim 1 wherein said control transistor is a bipolar device having collector, emitter, and base electrodes functioning respectively as said control transistor input, output and control electrodes.

3. The circuit of claim 1 wherein said control transistor is a MOS-FET device and said control electrode is the insulated gate of said MOS-FET device, whereby complete isolation is provided between said control voltage and said signal voltage.

4. The circuit of claim 1 wherein said control transistor is a J-FET device and said control electrode is the gate electrode of said J-FET device.

5. The circuit of claim 4 further comprising a bias potential in series with said unidirectional path.

* * * * *